(No Model.)

F. W. OFELDT.
PRESSURE GENERATOR FOR NAPHTHA ENGINES.

No. 356,420. Patented Jan. 18, 1887.

WITNESSES:
Helmer Westeen
F. M. Crossman

INVENTOR
F. W. Ofeldt
BY A. W. Almqvist
ATTORNEY

UNITED STATES PATENT OFFICE.

FRANK W. OFELDT, OF NEW YORK, N. Y., ASSIGNOR TO THE GAS ENGINE AND POWER COMPANY, OF SAME PLACE.

PRESSURE-GENERATOR FOR NAPHTHA-ENGINES.

SPECIFICATION forming part of Letters Patent No. 356,420, dated January 18, 1887.

Application filed October 11, 1886. Serial No. 215,835. (No model.)

*To all whom it may concern:*

Be it known that I, FRANK W. OFELDT, a citizen of Sweden, and a resident of New York, in the county and State of New York, have invented a new and useful Improvement in Pressure-Generators for Naphtha-Engines, of which the following is a specification.

The object of this invention is to provide a complete and efficient apparatus or retort for rapidly vaporizing a liquid, in order to utilize the vapor thus obtained either as the motive power in an engine or for producing an illuminating and heating gas, or both, as when the liquid used is a hydrocarbon, or for other purposes.

The apparatus or generator hereinafter described is the same as shown in connection with my naphtha or gas engine in my pending patent application, No. 206,190, filed June 25, 1886, the construction of the generator itself, independent of any particular engine, being the subject-matter of this present application.

Figure 1:
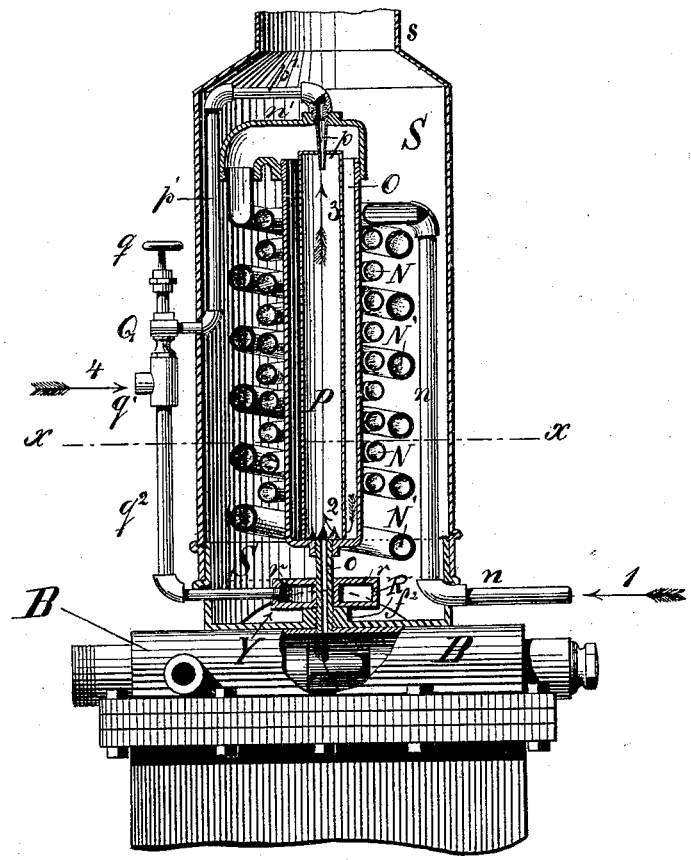
Figure 2:
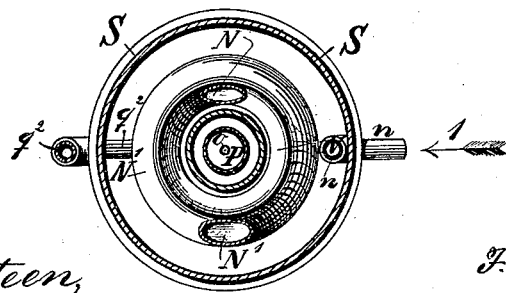

In the accompanying drawings, Figure 1 represents a sectional elevation of my improved vapor-generator applied to the valve-chest of an engine—for instance, to my naphtha-engine. Fig. 2 is a horizontal section of the same, taken on the line $x \, x$ of Fig. 1.

Like letters of reference indicate like parts.

The retort or generator proper is surrounded by a combustion-chamber, S, which, when applied to an engine, may be arranged upon the valve-chest B thereof, as shown in Fig. 1. A nipple, $f^2$, upon the top of the valve-chest serves to attach a pipe, $o$, for connecting the retort and the valve-chest.

$n$ is the feed-pipe through which the liquid pumped or otherwise supplied from the supply-tank enters the lower end of the combustion-chamber S. The pipe $n$ thence runs upward and connects with the upper end of a pipe, N, which is coiled, as shown in the drawings, and the lower end of which again connects with a pipe, N'. This latter is of larger size, and is coiled in an opposite direction to the pipe N, and surrounds the coil of the latter pipe.

The outer coiled pipe, N', is connected at its upper end by a casting, $n'$, (in about the shape of a reverted elbow-joint,) with the pressure-tube or vapor-chamber O, which from there continues downward centrally through the inner coil, N, and is closed at its lower end, with the exception of the central pipe, $o$, by which it is connected to the aforesaid nipple $f^2$, leading to the valve-chest. Within the tube O is a tube, P, of smaller diameter. This rests with its open lower end upon the bottom of the tube O, and is partly cut out at its edge, where it joins the tube O, leaving openings at arrow 2. The upper end of the tube P is closed, except having a central perforation, through which a downward-tapering tube, $p$, is inserted, whose upper end is threaded from the inside into a nipple on the aforesaid casting $n'$, to which nipple is threaded, from the outside, a coupling of a pipe, $p'$, connecting the tube P with an injector, Q.

It will be seen that the tapering pipe or tube $p$ serves two purposes: by its taper to make a tight joint without extra packing in the end of the tube P, and at the same time to retain the said tube in an upright position centrally within the tube O, so as to make the annular space between them uniform.

The injector-valve $g$ serves to stop, start, and regulate the flow of the gas from the pipe $p'$, which thence by the pipe $q^2$ is conveyed to a burner, R, a vent-coupling, $q'$, to admit air, forming the connection between the injector and the pipe $q^2$.

The burner R may be simply an annular casting held in place by being arranged to surround the pipe $o$ and rest upon the nipple $f^2$ of the valve-chest. The upper surface of the burner R is provided at its circumference with a series of outward-pointing holes, through which the flame issues against the coils and other parts of the retort for heating the liquid and converting it into gas.

By this construction it will be seen that the liquid entering in the direction of arrow 1, through the pipe N, to the retort, first passes downward through the entire inner coil, N, thence upward through the entire larger pipe, N', (the said pipe being increased in diameter so as to, as near as possible, correspond with the increased volume of the liquid as it is converted into gas, first of lower and then of higher grade or less density,) thence down into the tube O and through the annular space between the said tube and the inner tube, P. Thence the greater portion and the denser portion of the gas enters through the openings at the bottom edge of the inner tube, P, and through the pipe o, to the steam-chest, and thence through the cylinders. At the same time a portion of the highest grade of the gas—i. e., when naphtha or similar hydrocarbon is used—or that which has the least density, passes up, as indicated by arrow 2, into the inner tube, P, and thence in the direction of arrow 3 into the pipe $p'$ to the injector, in passing through which latter, owing to its velocity, it draws air in the direction of arrow 4 into the pipe $p'$ to the injector, in passing through which latter, owing to its velocity, it draws air in the direction of arrow 4, through the vent $q'$, and, thus charged with air, passes illuminating-gas into burner R. Draft for the burner R is provided by side openings, Y, at the lower end of the combustion-chamber, and the gases of combustion pass up through the smoke-stack $s$ on the upper end of the combustion-chamber S. It will thus be seen that when a combustible liquid—such as naphtha—is vaporized the lightest part of the gas may be separated by the inner tube, P, and conducted by the pipes $p'$ $q^2$ to the burner R, where it is utilized as fuel for heating the remainder. When a non-combustible liquid is vaporized, the inner tube, P, and its connection to the pipe $p'$ are dispensed with, and the fuel for heating is derived from a separate source.

Having thus described my invention, what I claim as new, and desire to secure by Letters Patent, is—

1. In a vapor-generator, the combination, with a supply-pipe, $n$, discharge-pipe $o$, combustion-chamber S, and heater R, of the retort formed of an inner tubular chamber, O, coiled pipe N, surrounding the said chamber, and a larger pipe, N', surrounding the said chamber O and pipes N, and wound in opposite direction to that of the said smaller coil, N, the joint $n'$ connecting the chamber O with the upper end of the larger coil, N', the said feed-pipe $n$ being connected to the upper end of the smaller coil, N, and the said coils N N', joint $n'$, and chamber O forming continuous connection from the feed-pipe $n$ to the discharge-pipe $o$, substantially as hereinbefore set forth.

2. In an apparatus for vaporizing a liquid convertible into combustible vapor, the combination, with a vaporizing-retort having supply and discharge pipes $n$ $o$ and heater R, a combustion-chamber, S, surrounding the said retort, and a fuel-supply pipe connecting the retort with the heater, of a tube or chamber, P, encircled by the retort, the said tube having openings at its lower edge, and connected by a pipe through its closed upper end with the supply-pipe to the heater, substantially as hereinbefore set forth.

In testimony that I claim the foregoing as my invention I have signed my name, in presence of two witnesses, this 31st day of August, 1886.

FRANK W. OFELDT.

Witnesses:
T. M. CROSSMAN,
A. W. ALMQVIST.